United States Patent
Leppo et al.

(12) 
(10) Patent No.: US 6,172,478 B1
(45) Date of Patent: Jan. 9, 2001

(54) POWER DISTRIBUTION IN A PORTABLE DEVICE

(75) Inventors: Lee Edward Leppo; Martin M. Weiss, both of The Woodlands; Prashant A. Solanki, Houston, all of TX (US)

(73) Assignee: Telxon Corporation, Akron, OH (US)

( * ) Notice: Under 35 U.S.C. 154(b), the term of this patent shall be extended for 0 days.

(21) Appl. No.: 09/510,829

(22) Filed: Feb. 23, 2000

(51) Int. Cl.$^7$ .......................... H01M 10/44; H01M 10/46
(52) U.S. Cl. ............................................. 320/116; 320/119
(58) Field of Search .................................. 320/103, 116, 320/118, 119, 128

(56) References Cited

U.S. PATENT DOCUMENTS 5,175,484 * 12/1992 Witehira et al. .
5,230,074 * 7/1993 Canova, Jr. et al. .
5,933,812   8/1999 Meyer et al. .

* cited by examiner

*Primary Examiner*—Edward H. Tso
(74) *Attorney, Agent, or Firm*—Amin, Eschweiler & Turocy, LLP

(57) ABSTRACT

A power distribution system is provided for distributing power in a portable device being coupable to a charging system and including a main battery power and a bridge battery power. The charging system is coupled to a power bus through a diode. The main battery power system and the bridge battery system are also both coupled to the power bus through diodes. The predetermined voltage level is set with respect to the charging system, the main battery and the bridge battery, such that if all three are coupled to the bus, the recharging system both powers the unit and recharges the main battery. If the recharging system is removed, the main battery power system powers the portable device, and if the main battery power system is removed the bridge battery will provide power to the portable device. The distribution system also includes a monitoring system for measuring the predetermined charge level on the battery and disabling a FET switch, so that the main battery stops charging to protect the main battery against overcharging. A monitoring system is also provided for monitoring the voltage level of the main battery utilizing a comparator system.

35 Claims, 8 Drawing Sheets

POWER DISTRIBUTION IN A PORTABLE DEVICE

TECHNICAL FIELD

The present invention relates to a portable devices and more particularly to a low cost power distribution system and method for a portable device that is powered by a recharger unit or alternatively a rechargeable battery. The portable device includes a bridge battery for powering the portable device in the event the rechargeable battery is removed.

BACKGROUND OF THE INVENTION

Portable electronic devices (e.g. notebook computers, cellular telephone, cordless telephones mobile data terminals, radio frequency portable communication devices, etc.) typically include a rechargeable battery that is charged by a recharging unit plugged into an AC power source, such as that found in conventional 115 VAC lines. The recharging unit powers the portable device, while simultaneously charging the rechargeable battery. The portable device switches over to battery power upon removal of the portable device from the charging unit or the power source. Most intelligent portable devices employ a bridge battery that is utilized during the removable of the main rechargeable battery when it powers the portable device. The main function of the bridge battery is to insure that data stored in a Random Access Memory (RAM) device is not lost during swapping of the rechargeable battery. The bridge battery is usually a much smaller battery because during a battery swap, the portable device normally will enter a low current or suspend mode, so that most current drawn from the bridge battery is used to refresh the RAM device, until a new main battery is installed into the device.

Many portable devices employ complicated switching or logic circuitry when changing from the rechargeable device power to the main battery power, and from the main battery power to the bridge battery power. The switching or logic circuitry takes up valuable space on a circuit board that could be utilized to perform the functions of the portable device. In some cases, additional circuit boards are necessary to house the switching or logic circuitry. This increases the size and cost of the portable device. Furthermore, some of these portable devices employ expensive power management and supervisory circuitry to cause the functional components in the portable device to enter different modes, depending on the type of unit powering the portable device or the current status of the unit powering the portable device. The additional power management and supervisory circuitry adds to the size, the cost and also to the complexity of the portable device.

Accordingly, there is a strong need in the art for a system and/or method that can provide power distribution for a portable electronic device at low cost, while reducing space utilized in employing such a system.

SUMMARY OF THE INVENTION

According to a preferred embodiment of the present invention, a power distribution system is provided for distributing power in a portable device being coupable to a charging system and including a main battery power system and a bridge battery power system. The charge system is coupled to a power bus through a diode. The main battery power system and the bridge battery system are also both coupled to the power bus through diodes. A predetermined voltage level is set with respect to the charging system, the main battery and the bridge battery such that if all three are coupled to the bus, the recharging system both powers the unit and recharges the main battery. If the recharging system is removed, the main battery power system powers the portable device, and if the main battery power system is removed, the bridge battery will provide power to the portable device. The distribution system also includes a monitoring system for measuring a predetermined charge level on the battery and disabling a FET switch, so that the main battery stops charging to protect the main battery against overcharging. A monitoring system is also provided for monitoring the voltage level of the main battery utilizing a comparator system. Accordingly, the present invention provides for a very low cost power distribution system for portable devices.

Thus, according to one aspect of the present invention, a power distribution system is provided that provides power to functional and power circuitry on a portable device. The system includes a main battery system coupled to a power bus through a first switch system and a charging system coupled to the power bus through a second switch system. The charging system provides power to the power bus through the second switch system while the charging system is coupled to the second switch system and the main battery system provides power to the power bus through the first switch system upon removal of the charging system.

In accordance with another aspect of the present invention a power distribution system is provided that provides power to functional and power circuitry on a portable device. The system includes a main battery system coupled to a power bus through a main battery diode and a bridge battery system coupled to the power bus through a bridge battery diode. The voltage level of the bridge battery is lower than the voltage level of the main battery and removal of the main battery system causes the second switch system to allow the bridge battery system to provide power to the power bus.

In accordance with yet another aspect of the present invention, a method is provided for power distribution in a portable device including a power bus coupled to a device power and functional circuitry. The method includes the steps of providing a main battery system coupled to a power bus through a main battery diode, providing a charging system coupled to the power bus through a charger diode and providing a bridge battery system coupled to the power bus through a bridge battery diode wherein the charging system has a voltage level above the main battery voltage level and the main battery has a voltage level above the bridge battery, such that the charger powers the power bus if the charger is present, the main battery powers the power bus if the charger is not present and the bridge battery powers the bus if the charger and the main battery are not present.

In accordance with another aspect of the present invention, a power distribution system is provided that provides power to functional and power circuitry on a portable device. The system includes means for providing main battery power. The means for providing main battery power includes means for coupling the means for providing main battery power to a power bus. The system also includes means for recharging the means for providing main battery power. The means for recharging the means for providing main battery power includes means for coupling the means for recharging to the power bus. The means for charging having a voltage level that is at a predetermined level above a voltage level of the means for providing main battery power causing the means for charging to simultaneously provide power to the power bus and recharge the means for providing main battery power.

In accordance with yet another aspect of the present invention, a power distribution system for a providing power to functional and power circuitry on a portable device is provided. The system includes a main battery system coupled to a power bus through a main battery diode, a charging system coupled to the power bus through a charger diode and a bridge battery system coupled to the power bus through a bridge battery diode. The charging system has a voltage level that is at a predetermined level above a voltage level of the main battery system and the voltage level of the bridge battery system is lower than the voltage level of the main battery system. If the charging system is present, the charger diode is forward biased and the charging system provides power to the power bus. If the charging system is not present, the main battery diode becomes forward biased and the main battery system provides power to the power bus. If the charging system and the main battery system are not present, the bridge battery diode becomes forward biased and the bridge battery system provides power to the power bus.

To the accomplishment of the foregoing and related ends, the invention then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed and the present invention is intended to include all such embodiments and their equivalents. Other objects, advantages and novel features of the invention will become apparent from the following detailed description of the invention when considered in conjunction with the drawings.

DETAILED DESCRIPTION OF THE INVENTION

The present invention will now be described with respect to the accompanying drawings in which like numbered elements represent like parts.

Figure 1:
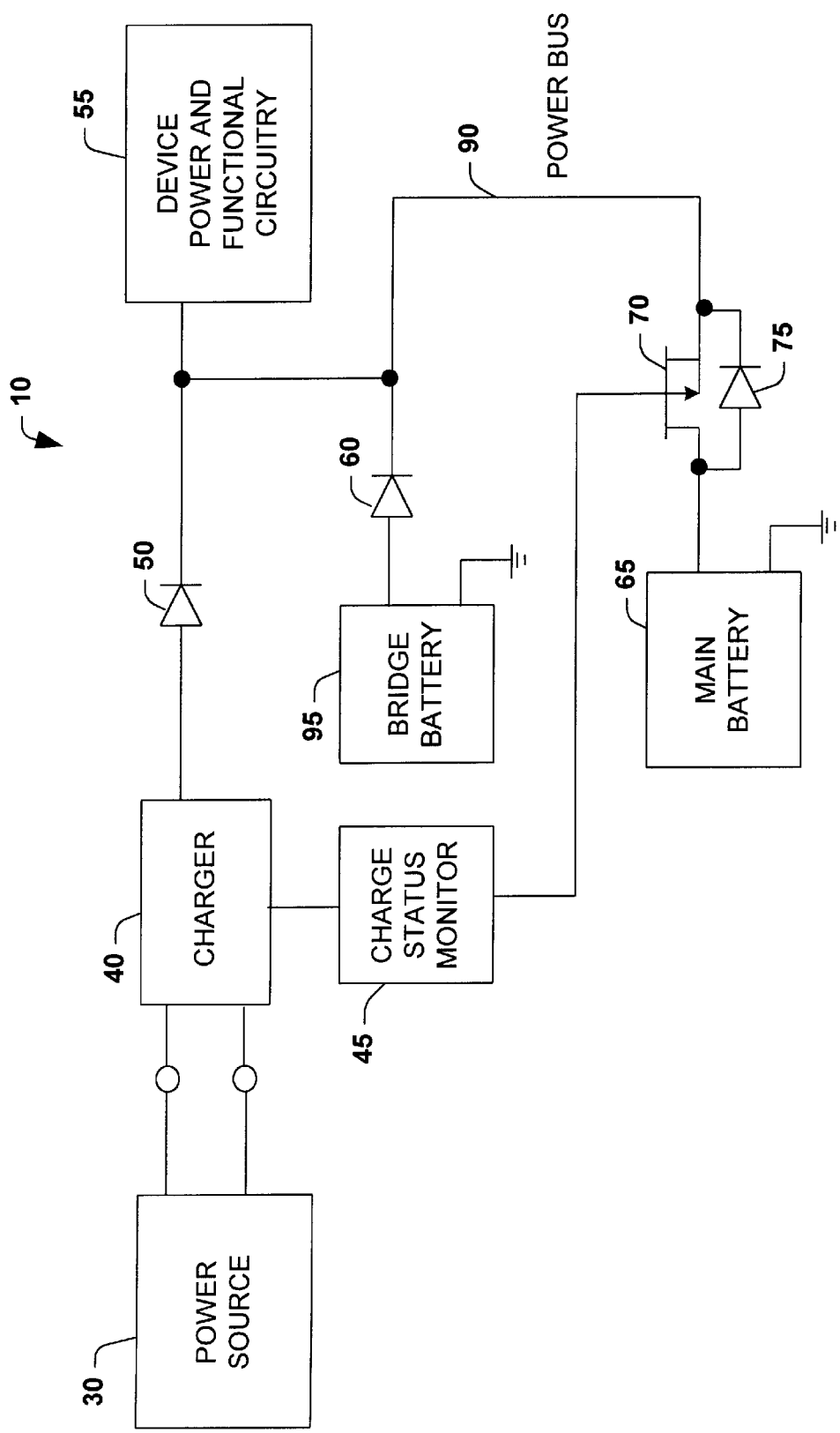
FIG. 1a illustrates a block diagram of a portable device coupled to a power source in accordance with one aspect of the present invention.
FIG. 1b illustrates a block diagram of a portable device coupled to a power source in accordance with another aspect of the present invention.
Figure 1A:
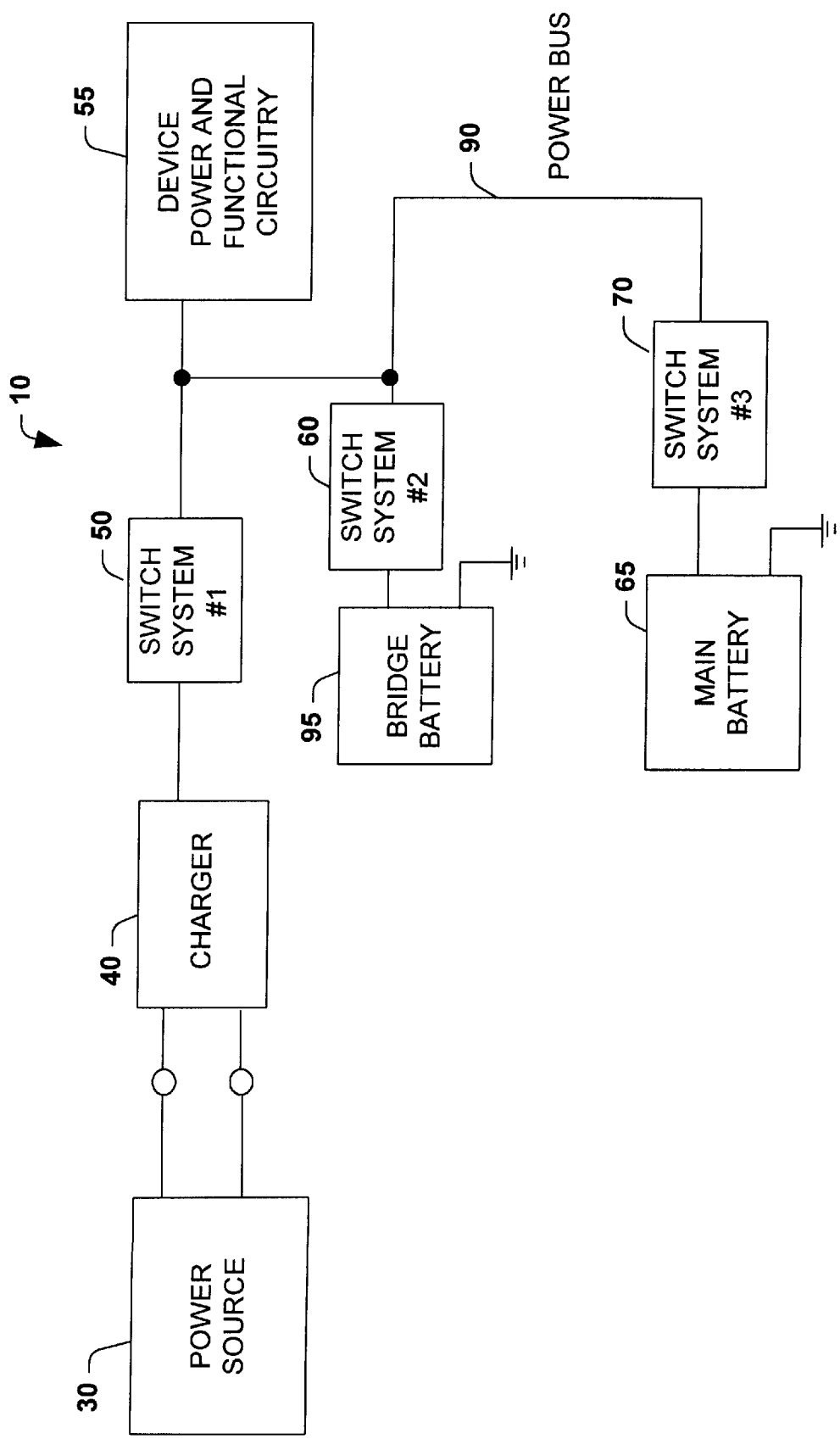

Referring initially to FIG. 1a, a portable device 10 is provided with a charger 40 coupled to a power source 30. The source 30 is preferably AC power and operates at an AC power line frequency of 60 Hz. However, it is appreciated that in other countries different line frequencies (e.g., 50 Hz) may be employed. The charger 40 provides power to a power bus 90 for use with powering device power and functional circuitry 55 and recharging a main battery 65. The charger 30 is coupled to the power bus 90 through a first switch system 50. A bridge battery 95 is provided coupled to the power bus 90 through a second switch system 60. The main battery 65 is coupled to the power bus 90 through a second switch system 70. The charging system 40 powers the portable device 10 while the power source 30 is connected to the charger 40. The first switch system 50 provides power to the power bus 50, when the power source 30 is connected. After the power source 30 is removed, the first switch system 50 disables and the third switch system 70 allows power to be provided to the power bus 90 from the main battery 65. If the main battery is disabled, the third switch system 60 disables and the second switch system 60 allows power to be provided to the power bus 90 from the bridge battery 70.

In a preferred aspect of the invention, the first switch system 50 and the second system 60 are replaced with diodes and the third switch system is replaced with a diode and FET combination. Referring now to FIG. 1a b, the portable device 10 is provided with the charger 40 coupled to the power source 30. The charger 40 provides power to the power bus 90 for use with powering device power and functional circuitry 55 and recharging the main battery 65. The charger 30 is coupled to the power bus 90 through a charger diode 51. The charger diode 51 begins conducting when the power source 30 is connected to the charger 40. Preferably, the charger is a lithium ion charger. However, it should be appreciated that the charger could be other types of chargers beside lithium, depending on the type of battery being recharged. The main battery 65 is coupled to the power bus 90 through a main battery diode 75. The main battery diode 75 is connected to a Field Effect Transistor (FET) switch 71 in a parallel relationship. The opening and closing of the FET switch 71 is controlled by a charge status monitor 45. The charge status monitor 45 could include a timer circuit that begins counting when the charger 40 begins operation by being connected to the power source 30. The timing circuit could include a processor (not shown), such as Intel's 8 bit microcontroller, the 8031, 8051 or 8052. Furthermore, the manner in programming the processor to operate the invention according to the description herein will be apparent to those skilled in the art of computer programming. The FET switch 71 is closed upon detection of the charger 40 allowing the charger 40 to charge the main battery 65. After a predetermined amount of time, the charge status monitor 45 changes the state of the FET switch 71, so that the FET switch 71 enters an open state and stops charging the main battery 65.

The removal of power source 30 causes the charger diode 51 to stop conducting. This causes the charger 40 to stop charging the main battery 65 and to stop providing power to the device power and functional circuitry 55. Turning off the lithium charger 40 results in a voltage drop on the power bus 90. The positive voltage drop between the main battery 65 and the power bus 90 causes the main battery diode 75 to begin conducting, such that the device power and functional circuitry 55 are powered by the main battery 65. It is well known in the art that a diode becomes forward biased when a voltage drop of about 0.6–1.0 volts, depending on the type of diode, is provided from a cathode side to an anode side causing the diode to conduct and resemble a short circuit. Furthermore, the diode resembles an open circuit if the voltage drop is less than 0.6–1.0 volts or is a positive voltage drop from the anode to the cathode.

The bridge battery 95 is provided coupled to the power bus 90 through a bridge battery diode 61. The bridge battery 95 is provided to supply power to the portable device 10 in the event that the main battery 65 fails or is being replaced. The bridge battery 95 is a much smaller battery than the main battery 65 and functions to provide current mostly to a RAM device within the device power and functional circuitry 55. The other circuitry utilized in the portable device 10 operates in the suspend or low current mode, so that only a small amount of current is necessary to continue operation of the portable device 10. For example, the bridge battery 95 typically may provide 1–1.2 millamps of current to the portable device 10 when it operates in the suspend mode, while the main battery 65 may be supplying 1–1.2 amps during normal operation of the portable device 10.

The main battery 65 is preferably at a voltage range of between 3–4.2 volts with a nominal voltage of 3.6 volts, while the voltage range of the bridge battery is preferably at 2–3.2 volts with a nominal voltage of 2.4 volts. In the event that the main battery 65 is removed or malfunctions, the main battery diode 75 stops conducting. This results in a voltage drop on the power bus 90. The positive voltage drop between the bridge battery 65 and the power bus 90 causes the bridge battery diode 61 to begin conducting, such that the device power and functional circuitry 55 are powered by the bridge battery 65. If the main battery 65 is replaced, the voltage level on the bus rises above the voltage of the bridge battery and causes the bridge battery diode 61 to stop conducting. Thus, by utilizing diode coupling to the power bus 90, a power distribution system is provided that is inexpensive, takes up very little room on a circuit board, and is simple to fabricate.

Figure 2:
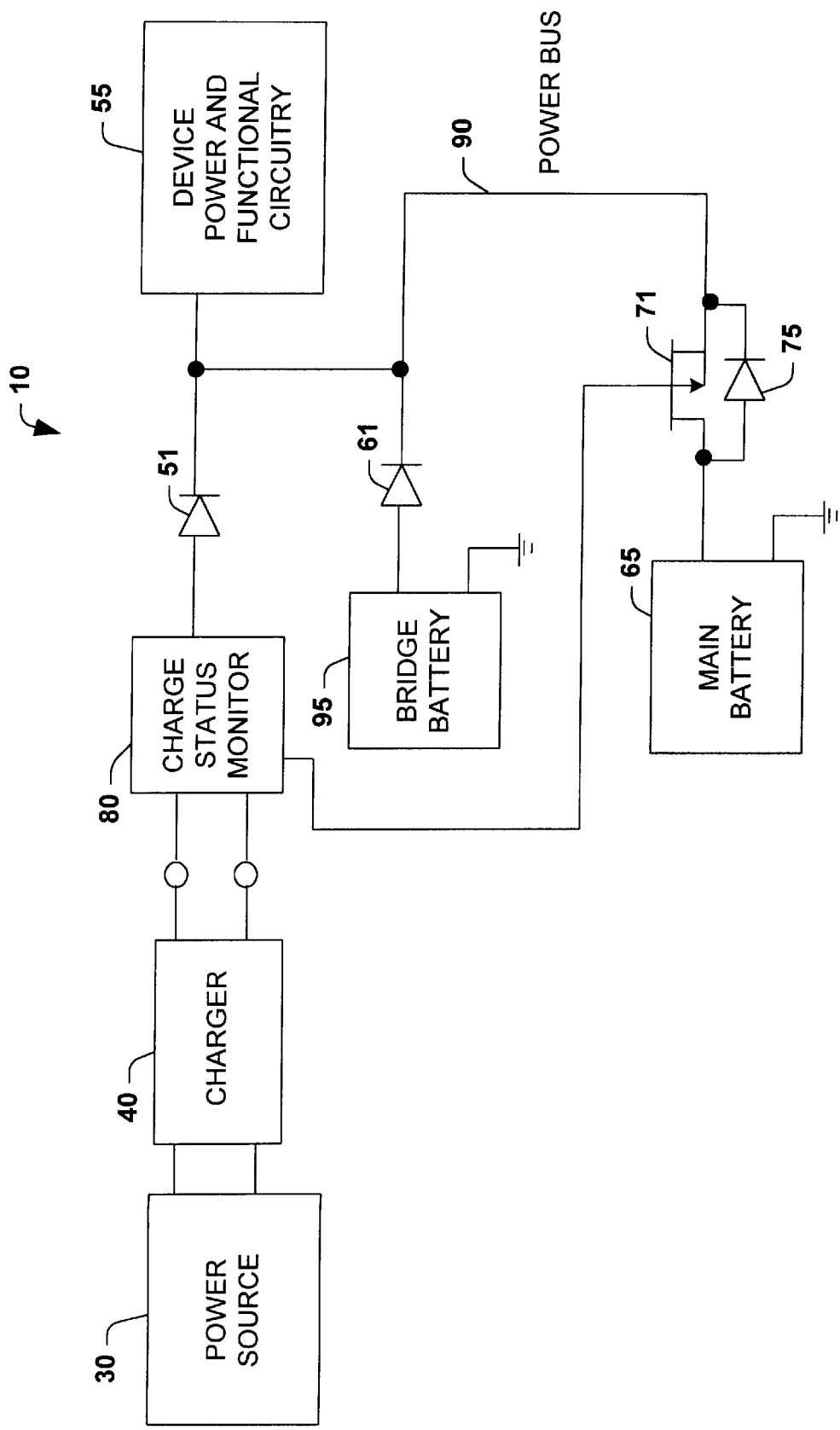
FIG. 2 illustrates a block diagram of a portable device coupled to a charger in accordance with another aspect of the present invention.

It should be appreciated that the lithium charger 40 could be a separate unit from the portable device 10. For example, FIG. 2 illustrates a system where the charger 40 is a separate device coupled to the portable device 10 via a charge status circuit 80. In this embodiment of the invention, the charge status circuit 80 monitors the charge current of the battery utilizing conventional current sensing techniques. If the charge current drops to a certain level indicating that the main battery 65 has become fully charged, the charge status 80 will alternate the state of FET switch 71 causing the switch to open. The charge status circuit 80 could monitor the temperature of the main battery 65 to determine if it has reached full charge capability. It should be noted that the charger 40 could take the form of a conventional cradle device that the portable device 10 rests in, as it recharges.

Figure 3:
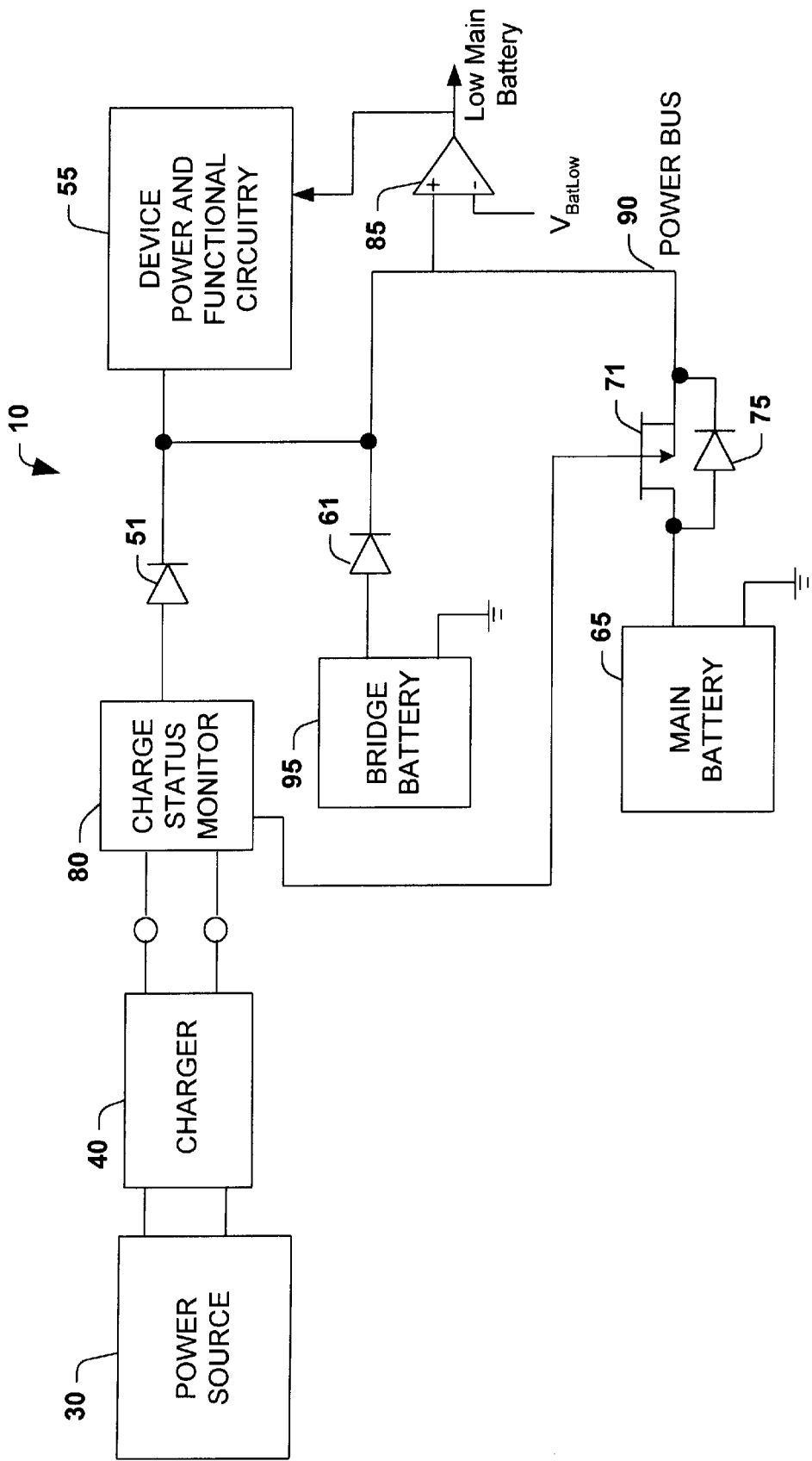
FIG. 3 illustrates a block diagram of a portable device including a low battery voltage monitor in accordance with the present invention.

Referring to FIG. 3, the portable device 10 could include a low main battery power warning system. The portable device 10 could utilize a comparator 85 to monitor the voltage level of the power bus 90. In the embodiment shown in FIG. 3, the positive terminal of the comparator is connected to the power bus 90, while the negative terminal of the comparator 85 is connected to a reference voltage labeled as $V_{BatLow}$. The output of the comparator 85 labeled as "Low Main Battery" changes state when the voltage level on the power bus 90 drops below the reference signal. The output signal can be coupled to the unit power and functional circuitry 55 to perform a power down routine on the portable device 10 or cause the portable device to enter the suspend mode. The output signal can also be coupled to a display or a Light Emitting Diode (LED) to provide a visual warning to the user.

Figure 4:
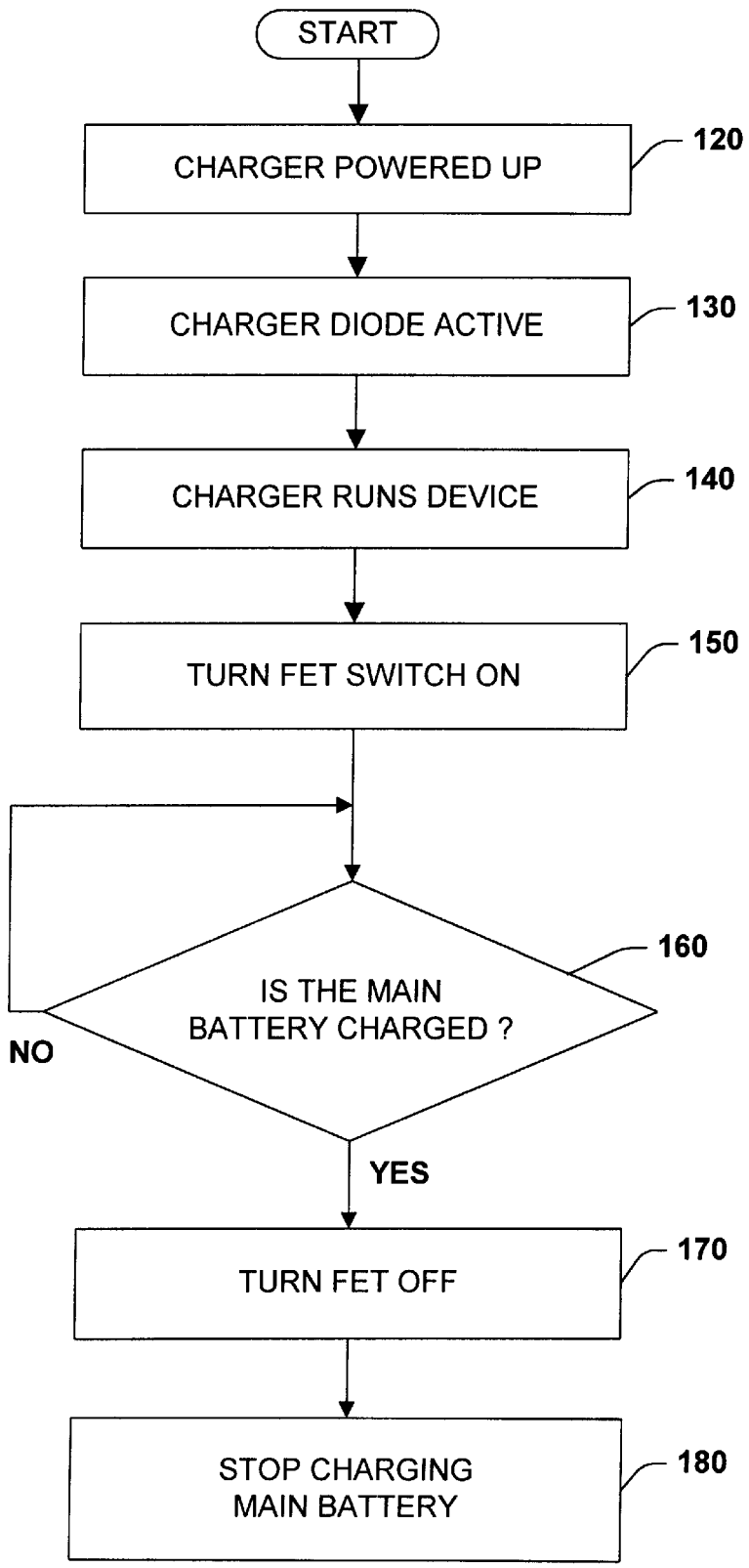
FIG. 4 illustrates a flow diagram for providing power to the portable device and the rechargeable main battery in accordance with the present invention.

FIG. 4 illustrates the steps taken by the present invention to ensure that the charger 40 provides power to the unit power and functional circuitry 55, and also performs the function of recharging the main battery 65 when the charger 40 is operably coupled to the power bus 90 via the diode 51. Beginning in step 120, the potable device 10 is coupled to the charger 40 and the charger 40 is powered up. This may be accomplished by coupling the portable device 10 to the power source 30, as shown in FIG. 1, or by coupling the portable device 10 to the charger 40, as shown in FIGS. 2–3. This depends on whether or not the charger 40 is a separate unit from the portable device 10 or is part of portable device 10. In step 130, the charger diode 51 begins conducting because the voltage level produced by the charger is above the voltage level of the main battery 65 and the bridge battery 95 causing the charger diode 51 to become forward biased and begin conducting. In step 140, the charger provides power to the power bus 60 and runs the portable device 10. In step 160 the FET switch 71 is turned on, which allows the charger 40 via the power bus 90 to provide current to the main battery 65, thus recharging the main battery 65. The charge status monitor 80 monitors the charge provided to the main battery 65 from the charger 40. As previously discussed, the charge status monitor 80 could monitor the charge by utilizing a timer device or monitor the current draw utilizing conventional current measurement techniques. The charge status monitor 80 determines if the main battery 65 has met a predetermined charge level. If no, the charger 40 continues charging the main battery 65. If yes, the charge status monitor turns the FET switch 71 off in step 180, such that the main battery 65 stops charging in step 190.

Figure 5:
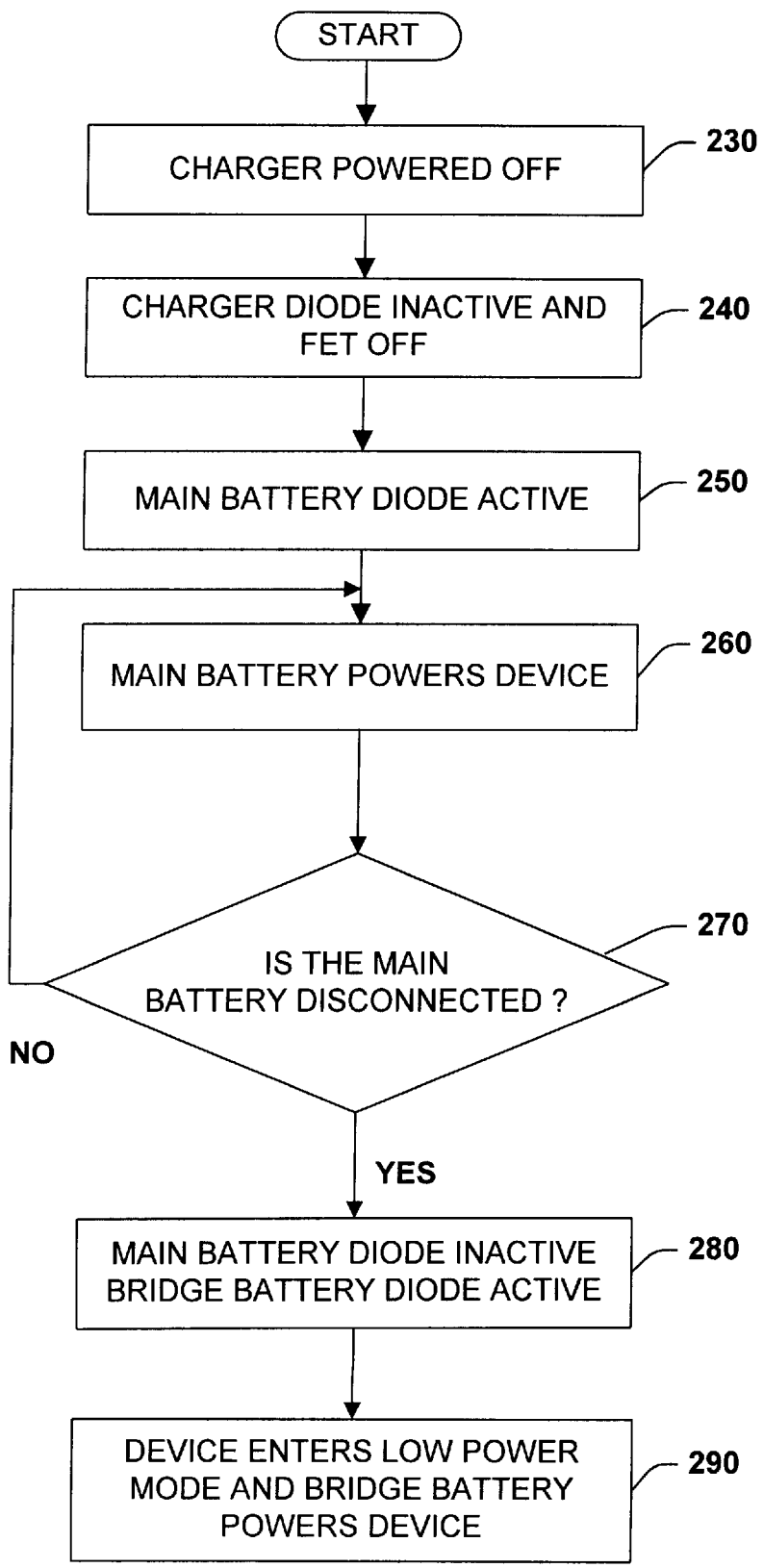
FIG. 5 illustrates a flow diagram for providing bridge battery power to the portable device in the event of removal of the main battery power in accordance with the present invention.

FIG. 5 illustrates the steps taken by the present invention to ensure that the main battery 65 provides power to the unit power and functional circuitry 55 if the charger 40 is removed, and also that the bridge battery provides power to the unit power and functional circuitry 55 if the charger 40 and the main battery 65 is removed. Beginning in step 230, the charger 40 is powered off. In step 240, the charger diode 51 becomes inactive and the FET switch 71 turns off. This causes a voltage drop across the main battery diode 75, causing the main battery diode 75 to begin conducting and become active in step 250. Since the voltage level provided to the power bus 90 from the main battery 65 is higher than the bridge battery voltage 95, the bridge battery 60 does not conduct. The main battery then provides power to the power bus 90, so that the portable device can run. The portable device 10 continues to be powered by main battery 65, until the main battery 65 is disconnected form the portable device in step 270. Once the main battery 65 is disconnected, the main battery diode 75 becomes inactive and the bridge battery diode 61 becomes active in step 280. This is because the voltage level on the power bus 90 falls below the voltage level of the bridge battery 95. In step 290, the device 10 enters the low power mode or suspend state, and the bridge battery 95 powers the device 10.

Figure 6:
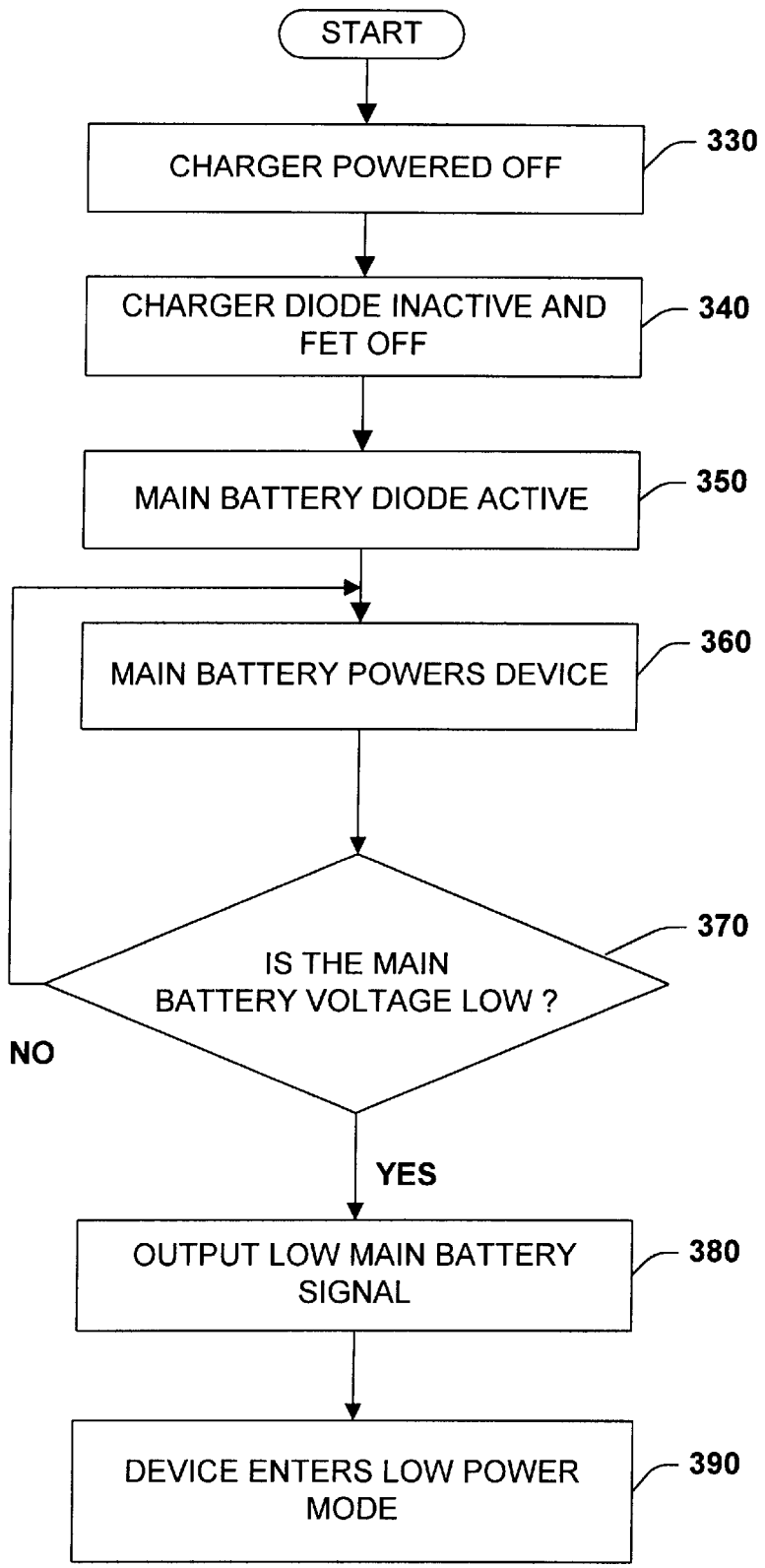
FIG. 6 illustrates a flow diagram for providing a low battery power warning signal to the portable device in accordance with the present invention.

FIG. 6 illustrates the steps taken by the present invention to insure that the main battery 65 provides the proper level of voltage to power the unit power and functional circuitry 55, if the charger 40 is removed. Beginning in step 330, the charger 40 is powered off. In step 340, the charger diode 50 becomes inactive and the FET switch 71 turns off. This causes a voltage drop across the main battery diode 75, causing the main battery diode 75 to begin conducting and become active in step 350. Since the voltage level provided to the power bus 90 from the main battery 65 is higher than the bridge battery voltage 95, the bridge battery diode 61 does not conduct. The main battery 65 then provides power to the power bus 90, so that the portable device can run in step 360. The comparator 85 monitors the voltage level of the power bus 90 to insure that it stays above a predetermined level in step 370. If the voltage is low on the power bus 90, the comparator 85 transmits an output low main battery signal, in step 380, to the device power and functional circuitry 55, so that the device 10 can enter the low power mode in step 390. It should be appreciated that the signal may be coupled to an LED or a display to provide a visual warning to the user of device 10. It should also be appreciated that the device 10 could power down upon detection of a low battery voltage level.

The invention has been described with reference to the preferred embodiments. Obviously, modifications and alterations will occur to others upon reading and understanding the preceding detailed description. It is intended that the invention be construed as including all such modifications alterations, and equivalents thereof.

What is claimed is:

1. A power distribution system for a providing power to functional and power circuitry on a portable device, comprising;
    a main battery system coupled to a power bus through a first switch system; and
    a charging system coupleable to the power bus through a second switch system;
    wherein the charging system provides power to the power bus through the second switch system while the charging system is coupled to the second switch system and the main battery system provides power to the power bus through the first switch system upon removal of the charging system.

2. The system of claim 1, further including a bridge battery system coupled to the power bus through a third switch system wherein the voltage level of the bridge battery is lower than the voltage level of the main battery and removal of the main battery system and the charging system causes the third switch system to allow the bridge battery system to provide power to the power bus.

3. The system of claim 1, wherein the second switch system includes a switch disposed between the main battery system and the power bus, the charging system charging the battery system when the switch is activated and not charging the battery system when the switch is deactivated.

4. The system of claim 3, wherein the second switch system includes a main battery diode and the switch coupled in parallel with the main battery diode.

5. The system of claim 4, wherein the switch is a FET switch.

6. The system of claim 3, further including a charge status monitoring system, the charge status monitoring system monitoring the charge level of the main battery wherein the charging of the main battery is discontinued once the battery meets a predetermined charge level determined by the charge status monitoring system.

7. The system of claim 6, wherein the charge status monitor system includes a timer device that causes the charging of the main battery to discontinue after a predetermined amount of time.

8. The system of claim 7, wherein the charge status monitor system includes a current measuring device for monitoring the current draw from the charger.

9. The system of claim 3, further including a low main battery power monitoring system wherein the low main battery power monitoring system detects a voltage level below a predetermined level of the main battery and outputs a low main battery signal.

10. The system of claim 9, wherein the low main battery power monitoring system includes a comparator circuit coupled at a first terminal to the power bus and coupled to a second terminal by a reference signal.

11. The system of claim 1, wherein the first switch system is a charger diode.

12. The system of claim 1, wherein the second switch system is a main battery diode.

13. A power distribution system for a providing power to functional and power circuitry on a portable device, comprising;
    a main battery system coupled to a power bus through a first switch system; and
    a bridge battery system coupled to the power bus through a second switch system wherein the voltage level of the bridge battery is lower than the voltage level of the main battery and removal of the main battery system causes the second switch system to allow the bridge battery system to provide power to the power bus.

14. The system of claim 13, wherein the first switch system includes a main battery diode.

15. The system of claim 13, wherein the second switch system is a bridge battery diode.

16. The system of claim 13, further including a charging system coupled to the portable device and the power bus through a third switch system wherein the charging system has a voltage level that is at a predetermined level above a voltage level of the main battery system and the charging system provides power to the power bus through the third switch system when the charger is operating.

17. The system of claim 16, wherein the second switch system is a charger diode.

18. The system of claim 13, wherein the first switch system includes a switch disposed between the main battery system and the power bus, the charging system charging the battery system when the switch is activated and not charging the battery system when the switch is deactivated.

19. The system of claim 18, wherein the first switch system includes a main battery diode and the switch coupled in parallel with the main battery diode.

20. The system of claim 19, wherein the switch is a FET switch.

21. The system of claim 13, further including a charge status monitoring system, the charge status monitoring system monitoring the charge level of the main battery wherein the charging of the main battery is discontinued once the battery meets a predetermined charge level determined by the charge status monitoring system.

22. The system of claim 21, wherein the charge status monitor system includes a timer device that causes the charging of the main battery to discontinue after a predetermined amount of time.

23. The system of claim 21, wherein the charge status monitor system includes a current measuring device for monitoring the current draw from the charger.

24. The system of claim 13, further including a low main battery power monitoring system wherein the low main battery power monitoring system detects a voltage level below a predetermined level of the main battery and outputs a low main battery signal.

25. The system of claim 24, wherein the low main battery power monitoring system includes a comparator circuit coupled at a first terminal to the power bus and coupled to a second terminal by a reference signal.

26. A method for power distribution in a portable device including a power bus coupled to a device power and functional circuitry, comprising the steps of;

providing a main battery system coupled to a power bus through a main battery diode;

providing a charging system coupled to the power bus through a charger diode; and providing a bridge battery system coupled to the power bus through a bridge battery diode wherein the charging system has a voltage level above the main battery voltage level and the main battery has a voltage level above the bridge battery, such that the charger powers the power bus if the charger is present, the main battery powers the power bus if the charger is not present and the bridge battery powers the bus if the charger and the main battery are not present.

27. The method of claim 26, further including the step of recharging the main battery system from the charging system.

28. The method of claim 26, further including the step of monitoring the charge level of the main battery and discontinuing the charging of the main battery upon reaching a predetermined charge level.

29. The method of claim 26, further including the step of monitoring the voltage level of the main battery and outputting a low battery voltage signal when the voltage level falls below a predetermined level.

30. A power distribution system for a providing power to functional and power circuitry on a portable device, comprising;

means for providing main battery power, the means for providing main battery power including means for coupling the means for providing main battery power to a power bus; and means for recharging the means for providing main battery power, the means for recharging the means for providing main battery power including means for coupling the means for recharging to a power bus;

wherein the means for charging has a voltage level that is at a predetermined level above a voltage level of the means for providing main battery power causing the means for charging to simultaneously provide power to the power bus and recharge the means for providing main battery power.

31. The system of claim 30, further including means for providing power to the power bus in the event the means for providing main battery power is removed, the means for providing power to the power bus in the event the means for providing main battery power is removed including means for coupling the means for providing power to the power bus in the event the means for providing main battery power is removed to the power bus.

32. The system of claim 30, further including means for monitoring the charge level of the means for providing main battery power.

33. The system of claim 30, further including means for monitoring the voltage level of the means for providing main battery power.

34. The system of claim 30, further including means for enabling and disabling the recharging of the means for providing main battery power.

35. A power distribution system for a providing power to functional and power circuitry on a portable device, comprising;

a main battery system coupled to a power bus through a main battery diode;

a charging system coupled to the power bus through a charger diode; and a bridge battery system coupled to the power bus through a bridge battery diode;

wherein the charging system has a voltage level that is at a predetermined level above a voltage level of the main battery system and the voltage level of the bridge battery system is lower than the voltage level of the main battery system, such that if the charging system is present the charger diode is forward biased and the charging system provides power to the power bus, if the charging system is not present the main battery diode becomes forward biased and the main battery system provides power to the power bus and if the charging system and the main battery system are not present the bridge battery diode becomes forward biased and the bridge battery system provides power to the power bus.

* * * * *

UNITED STATES PATENT AND TRADEMARK OFFICE
CERTIFICATE OF CORRECTION

PATENT NO.: 6,172,478 B1

DATED: January 9, 2001

INVENTOR(S): Leppo, *et al.*

Figure 1B:
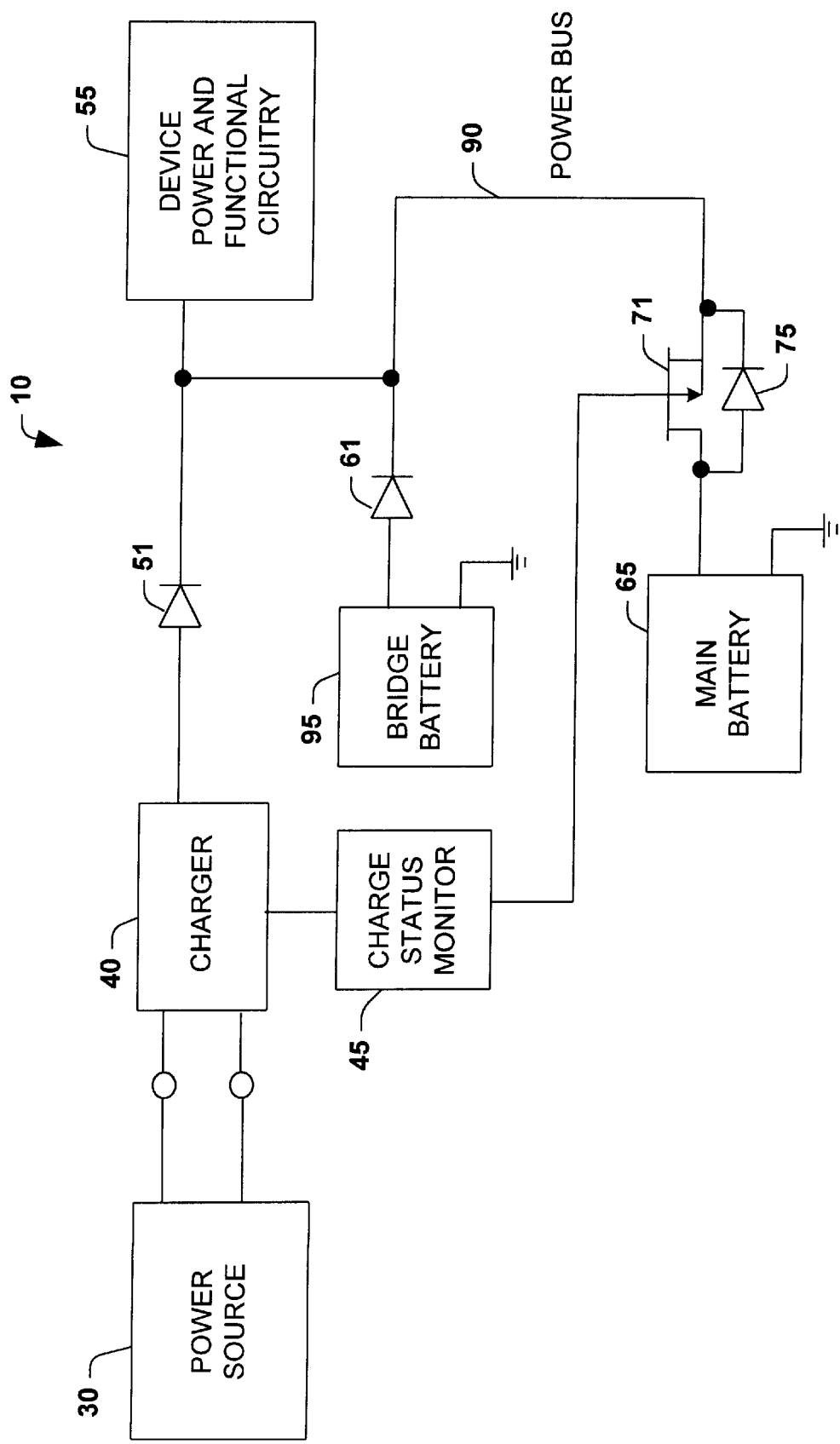

It is certified that error appears in the above-identified patent and that said Letters Patent is hereby corrected as shown below:

At column 4, line 27: please replace "Fig. 1a b" with --Fig. 1b--.

Signed and Sealed this

Twenty-ninth Day of May, 2001

*Attest:*

NICHOLAS P. GODICI

*Attesting Officer*  *Acting Director of the United States Patent and Trademark Office*

UNITED STATES PATENT AND TRADEMARK OFFICE
CERTIFICATE OF CORRECTION

PATENT NO. : 6,172,478 B1
DATED : January 9, 2001
INVENTOR(S) : Leppo et al.

It is certified that error appears in the above-identified patent and that said Letters Patent is hereby corrected as shown below:

Column 1,
Line 28, please replace "insure" with -- ensure --.
Line 62, please replace "coupable" with -- coupleable --.

Column 3,
Line 4, please delete "a" first occurrence.

Column 4,
Line 13, please replace "second" with -- third --.
Line 21, please replace "60" with -- 70 --.
Line 23, please replace "70" with -- 95 --.
Line 25, after "second" please insert -- switch --.
Line 26, after "third switch system" please insert -- 70 --.
Line 30, please replace "use with powering" with -- powering unit or --.
Line 32, please replace "30" with -- 40 --.
Line 51, after "detection of" please insert -- power to --.

Column 5,
Line 27, please replace "65" with -- 95 --.
Line 30, please replace "65" with -- 95 --.
Line 41, please replace "circuit" with -- monitor --.
Line 42, please replace "circuit" with -- monitor --.
Line 46, after "status" please insert -- monitor --.
Line 47, please replace "circuit" with -- monitor --.

Column 6,
Line 6, please replace "potable" with -- portable --.
Line 9, please replace "FIG. 1" with -- FIGS. 1a-1b --.
Line 18, please replace "60" with -- 90 --.
Line 19, please replace "160" with -- 150 --.
Line 28, after "level" please insert -- at 160 --.
Line 31, please replace "180" with -- 170 --.
Line 31, please replace "190" with -- 180 --.
Line 37, please replace "is" with -- are --.
Line 44, please delete "95".
Line 44, please replace "60" with -- diode 61 --.
Line 48, please replace "form" with -- from --.

UNITED STATES PATENT AND TRADEMARK OFFICE
CERTIFICATE OF CORRECTION

PATENT NO. : 6,172,478 B1
DATED : January 9, 2001
INVENTOR(S) : Leppo et al.

It is certified that error appears in the above-identified patent and that said Letters Patent is hereby corrected as shown below:

Column 6,
Line 57, please replace "insure" with -- ensure --.
Line 60, please replace "50" with -- 51 --.

Column 7,
Line 3, please replace "insure" with -- ensure --.

Drawings
Please delete Fig. 1 from the drawings.

Signed and Sealed this

Nineteenth Day of February, 2002

Attest:

JAMES E. ROGAN
Director of the United States Patent and Trademark Office

Attesting Officer